(No Model.) 3 Sheets—Sheet 3.
J. C. FOWLER.
MACHINE FOR CUTTING LOBED GEARS.
No. 414,803. Patented Nov. 12, 1889.
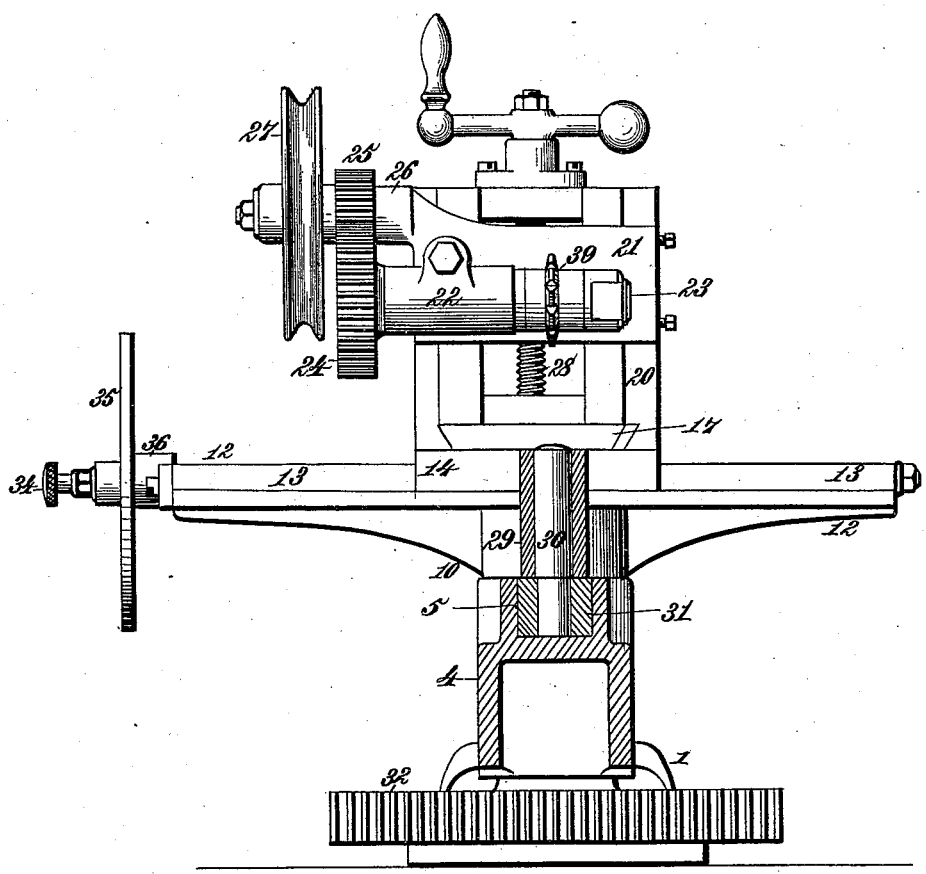
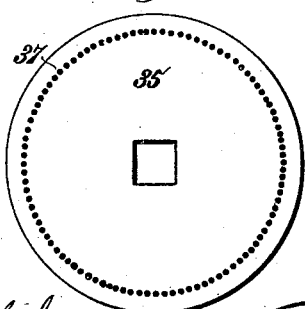
Witnesses.
Inventor.
Joseph C. Fowler.
By James L. Norris.
Atty.

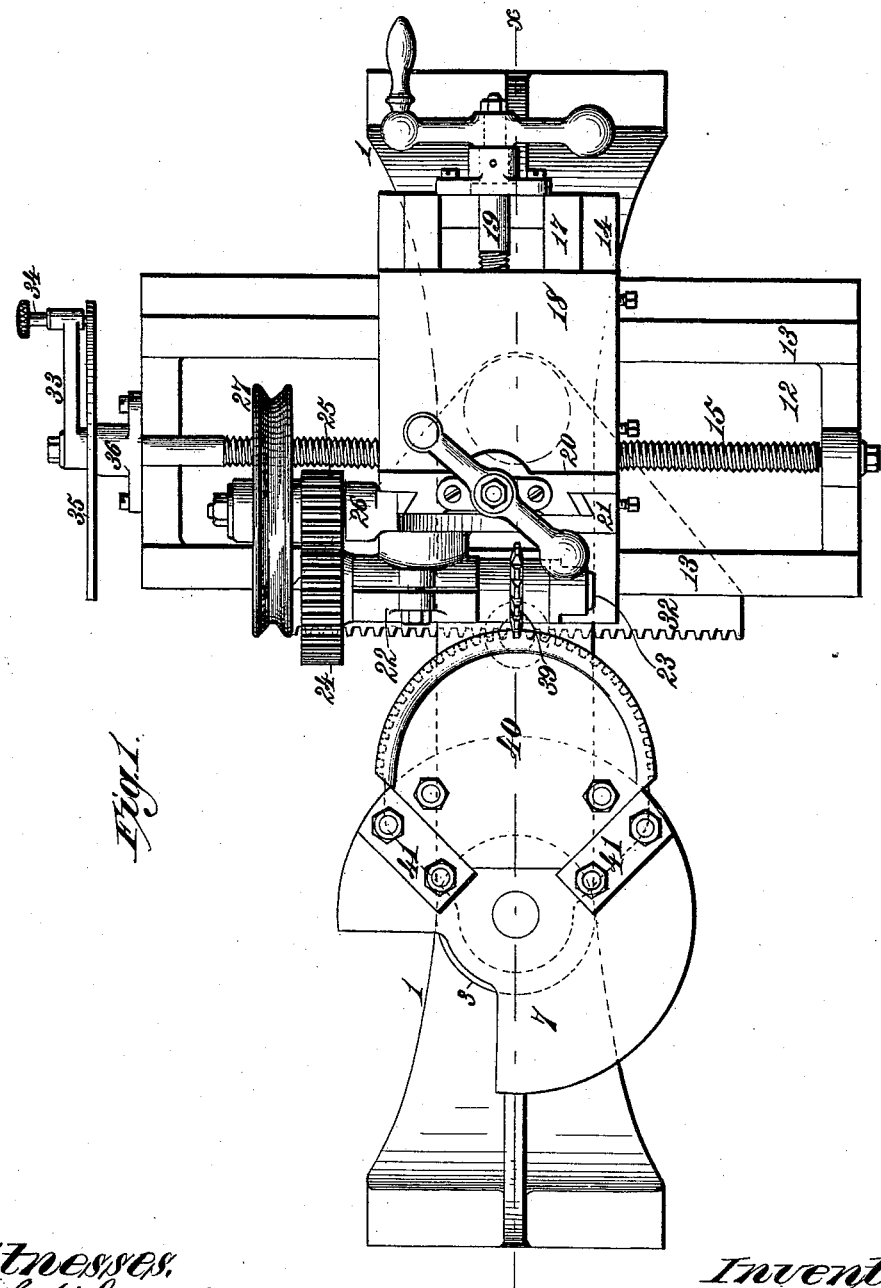

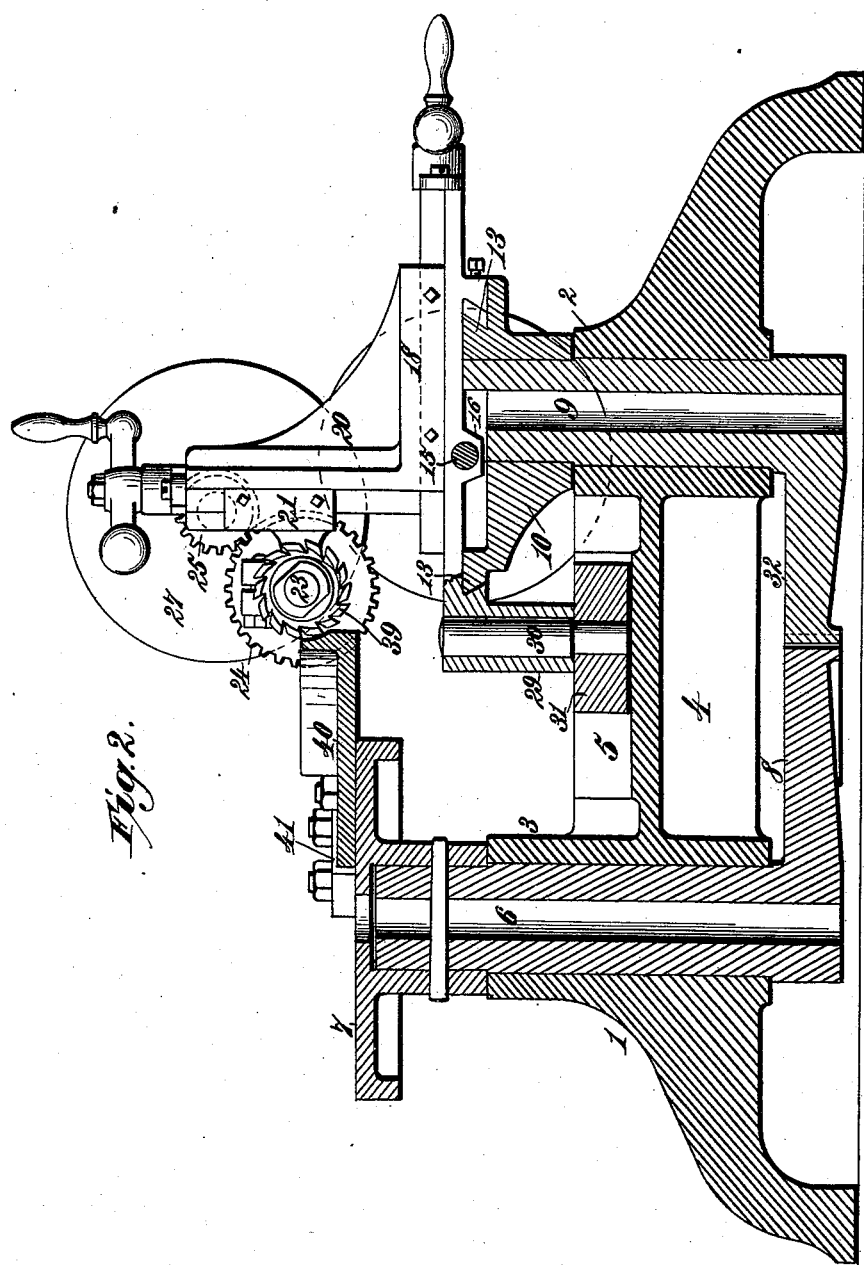

UNITED STATES PATENT OFFICE.

JOSEPH C. FOWLER, OF WASHINGTON, DISTRICT OF COLUMBIA.

MACHINE FOR CUTTING LOBED GEARS.

SPECIFICATION forming part of Letters Patent No. 414,803, dated November 12, 1889.

Application filed March 7, 1889. Serial No. 302,307. (No model.)

*To all whom it may concern:*

Be it known that I, JOSEPH C. FOWLER, a citizen of the United States, residing at Washington, in the District of Columbia, have invented new and useful Improvements in Gear-Cutting Machines, of which the following is a specification.

My present invention relates to gear-cutting machines, and especially to that class of machines for cutting the gears upon the quadri-lobate impressors used in the rectangular-bed printing-press shown and described in a joint application by Joseph C. Fowler and Edward A. Henkle, filed the 31st day of January, 1888, Serial No. 262,552, and more particularly for cutting the gearing used in the mechanical movement shown in an application filed by me of even date herewith, Serial No. 302,308.

It is the purpose of my invention to provide a gear-cutting mechanism whereby the teeth of a lobular gear may be cut to have accurate mesh with a polygonal gear having the same number of equal sides with the curved or lobe-shaped gear-sections of the intermeshing gear.

It is my purpose also to render the operative parts of the mechanism adjustable in such manner that the lobe-gear for a polygonal gear of any practicable number of sides may be accurately milled and the teeth cut at the proper angle and upon a true pitch-line. It is known that when a square gear is in mesh with what I may term a "quadri-lobate gear," or a triangular gear with a three-lobed gear, each upon a fixed axis, the pitch-lines of the latter will lie in curves which at each succeeding point depart from arcs of true circles. In cutting these gears it is essential that the metal blank be previously dressed off upon the proper curve, and that the gear-cutter be afterward presented at each cut at the proper angle.

It is the object of my invention, therefore, to provide a machine in which the gears may be cut to pattern, and wherein the gear-cutter shall be successively presented to the gear-blank at the proper point and accurate angle, the presentation of the tool being automatically effected by the successive gaged adjustments of a screw imparting step-by-step rotation to the pattern-gears.

The invention consists in the several novel features of construction and new combinations of parts hereinafter fully described, and then definitely pointed out in the claims following this specification.

Referring to the accompanying drawings, Figure 1 is a plan view of a gear-cutting machine embodying my invention. Fig. 2 is a vertical longitudinal section of Fig. 1 in the line *x x*. Fig. 3 is a vertical transverse section in the plane of the gear-cutting tool, Fig. 1. Fig. 4 is a detail view of the gage-plate by which the adjusting-screw is guided. Fig. 5 is a detail view of a milling-tool which may be substantiated for the gear-cutter.

In the said drawings, the reference-numeral 1 designates the base or frame of the machine supporting the operative parts. While this frame may be of varied construction, a convenient form is that shown, in which two strong castings, having suitable foot-pieces are provided with sleeves or tubular seats 2 and 3, connected and supported by an intermediate frame 4, in which is formed a channel 5, of any suitable width and depth. These castings, together with the intermediate frame 4, may be formed in a single integral casting, as shown, or in separate parts bolted together.

Within the sleeve 3 is mounted a shaft 6, upon the upper projecting end of which is secured a tabular support 7, of any suitable form, rigidly secured to the end of said shaft. Upon the lower end thereof, which projects below the lower extremity of the shaft 6, is rigidly mounted the pattern 8 of the lobe-section to be formed by the machine.

In the sleeve or bearing 2 is also placed a shaft 9, upon the upper projecting end of which is mounted a bracket-frame 10, having two lateral extensions 12, provided with rails 13, upon which is an adjustable carriage 14, which has longitudinal adjustment upon the ways 13 by means of a long screw-rod 15, tapped through a bracket or lug 16 on the carriage, and having bearing in the ends of the lateral extensions 12.

Upon the carriage 14 are formed or placed transverse ways 17, on which moves a main carriage 18, adjusted by a screw 19, and having an upright 20, on which is mounted a vertically-adjustable frame 21, having a bearing 22, in which is journaled a shaft 23, driven by a gear 24, meshing with a pinion 25, carried by a stud-bearing 26, which projects from the side of the adjustable frame 21, said shaft having driving-pulley 27, actuated from any convenient power-shaft. The frame 21 is raised and lowered by a vertical screw 28, tapped through a lug on the frame, and having bearing in the upper and lower parts of the upright 20.

Upon the main carriage 14 is mounted a central extension 29, projecting over the channel 5 and receiving an axis 30, upon the lower end of which is a guide-block 31, which lies in and fills said channel without obstructing its free movement.

Upon the lower end of the shaft 9, which projects below the sleeve 4, is rigidly mounted a straight pattern-gear 32, which represents the gear meshing with the lobe-section pattern-gear on the lower end of the shaft 6, the former or gear pattern 2 being one straight side of a polygonal gear, the true center of rotation of which is the axis of the shaft 6, while the latter is a curved gear-section, representing one lobe of the gear meshing with the straight pattern.

Upon the long screw 15 is a crank 33, having a spring-actuated pin 34, which moves over the face of a gage-plate 35, rigidly mounted upon a bearing 36, supporting the end of the shaft 15. This gage-plate is provided at equal intervals with a series of apertures or depressions 37, with which the end of the spring-actuated pin 34 engages as the screw is rotated, whereby the action of the screw is indicated and the crank-arm 33 held at any desired point.

Upon the shaft 23 is mounted either a milling or dressing tool 38 (shown in Fig. 5) or a gear-cutting tool 39, (shown in Figs. 2 and 3,) said tools being interchangeable.

The operation of the machine is as follows: The pattern-gears upon the shafts 3 and 4 respectively, being the one a lobe-shaped gear-section and the other a straight pattern-gear meshing therewith, a gear-blank 40, consisting of a metallic segment of proper radius, is laid upon the tabular support 7 and confined thereon between clamps 4 in such manner that its true axis of revolution corresponds with the axis of the shaft 3, carrying the similar pattern. The milling or dressing tool 38 being upon the cutter-shaft and the latter being set in motion, the tool will cut a vertical path in the edge of the blank corresponding to the line of the teeth-points in the pattern-gear, the dressing-tool being raised and lowered by the screw 28. After each cut the carriage or frame 21 is raised, and the screw 19 is then operated to throw the main carriage 14 in one direction or the other upon the ways 13. This operation also causes a fractional rotation of the shaft 9, carrying the straight pattern 32, and a similar rotation of the shaft 6 through the meshing lobe-shaped pattern 8. Inasmuch, however, as the entire bracket-frame 10, with its extensions 12, is swiveled upon the shaft 9 and confined or controlled as to its movement by the drop-shaft 30 and guide-block 31, running in the rigid guideway 5, any longitudinal movement of the carriage 14 will be accompanied by a corresponding axial adjustment of the main carriage 18, carrying the cutting-tool. It will be seen thus that at each new adjustment the cutter will be brought into a different relation with the blank upon which it acts and will operate thereon at a different angle, the movement being wholly controlled by the patterns carried by the shafts 6 and 9. The entire adjustment of the mechanism is effected by the screw 19, the operation of which is indicated by the gage-plate.

In cutting-gearing of this class it is desirable to dress off the edge of the blank-segment, and then replace the dressing or milling tool by the gear-cutter, the operation in both cases being identically the same.

What I claim is—

1. In a gear-cutting machine, a support for the gear-blank controlled by a lobe-shaped pattern-gear meshing with a pattern of the co-operating straight gear, a carriage for the tool, upon the axial support of which the latter pattern is mounted, and a connection between said carriage and a rigid support on the frame of the machine, said connection being provided with a guide-block adapted to slide in said support, substantially as specified.

2. In a gear-cutting machine, the combination of a tabular support mounted on an axis, to which is rigidly attached a lobe-shaped gear-pattern of the shape to which the blank is to be cut, a carriage mounted upon ways carried by an axis, to which is attached rigidly a straight-gear pattern meshing with the first pattern, a connection on the carriage-frame having a guide-block adapted to move in a transverse channel between the two axes, and means for imparting movement in either direction to the carriage, substantially as specified.

3. In a gear-cutting machine, the combination, with a tabular support for the gear-blank, of an axis upon which the said support is rigidly mounted, a lobe-shaped gear-pattern attached to said axis, a frame having ways mounted on an axis having a straight gear-pattern meshing with the first pattern, a carriage moving on said ways and having an arm provided with a drop-bearing carrying a guide-block lying in a channel between the two axes, a tool-carriage vertically movable on the first carriage and having a rotating cutting-tool, and means for imparting a horizontal movement to the carriage, substantially as specified.

4. In a gear-cutting machine, the combination of a tabular support for a gear-blank, rigid upon an axis having a lobe-shaped gear-pattern, a frame having ways and mounted on an axis having a straight gear-pattern meshing with the lobe-shaped gear-pattern on the axis of the tabular support, a sliding carriage on the ways having an arm provided with a drop-bearing having a guide-block lying in a channel between the two axes, a tool-carriage mounted and vertically adjustable on the sliding carriage, a cutting-tool driven by power on the tool-carriage, a screw journaled on the frame supporting the ways and meshing with the sliding carriage, and means for gaging the throw effected by said screw, substantially as specified.

In testimony whereof I have affixed my signature in presence of two witnesses.

JOSEPH C. FOWLER.

Witnesses:
JAMES L. NORRIS,
JAMES A. RUTHERFORD.